United States Patent
Doi et al.

(10) Patent No.: US 6,952,199 B2
(45) Date of Patent: Oct. 4, 2005

(54) INFORMATION EXTRACTION APPARATUS AND METHOD

(75) Inventors: Miwako Doi, Kanagawa-ken (JP); Naoko Umeki, Kanagawa-ken (JP); Isao Mihara, Tokyo (JP); Yasunobu Yamauchi, Kanagawa-ken (JP); Akira Morishita, Tokyo (JP); Shunichi Numazaki, Kanagawa-ken (JP); Takahiro Harashima, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 449 days.

(21) Appl. No.: 10/178,612

(22) Filed: Jun. 25, 2002

(65) Prior Publication Data

US 2002/0168092 A1 Nov. 14, 2002

Related U.S. Application Data

(63) Continuation of application No. 09/326,607, filed on Jun. 7, 1999, now Pat. No. 6,417,841.

(51) Int. Cl.[7] .............................................. G09G 5/08
(52) U.S. Cl. ........................ 345/158; 345/426; 463/36; 463/39
(58) Field of Search ............................... 345/158, 156, 345/426; 382/107, 103, 190; 463/36, 39

(56) References Cited

U.S. PATENT DOCUMENTS

| | | | | |
|---|---|---|---|---|
| 5,900,863 A | * | 5/1999 | Numazaki | 345/158 |
| 6,266,061 B1 | * | 7/2001 | Doi et al. | 715/863 |
| 6,272,244 B1 | * | 8/2001 | Takahashi et al. | 382/190 |
| 6,335,977 B1 | * | 1/2002 | Kage | 382/107 |
| 6,487,303 B1 | | 11/2002 | Yamaguchi et al. | |
| 6,490,006 B1 | * | 12/2002 | Monjo | 348/587 |
| 6,567,543 B1 | * | 5/2003 | Shiraiwa et al. | 382/167 |

FOREIGN PATENT DOCUMENTS

| | | |
|---|---|---|
| JP | 7-334299 | 12/1995 |
| JP | 9-97337 | 4/1997 |
| JP | 10-143659 | 5/1998 |

* cited by examiner

Primary Examiner—Alexander Eisen
Assistant Examiner—Kimnhung Nguyen
(74) Attorney, Agent, or Firm—Oblon, Spivak, McClelland, Maier & Neustadt, P.C.

(57) ABSTRACT

In an information extraction apparatus of the present invention, a distance image input section inputs a distance image including a plurality of objects to be respectively recognized. An area division section divides the distance image into a plurality of areas according to position information of a plurality of blocks to respectively execute an active event. An image processing section recognizes the plurality of objects in the areas corresponding to the blocks actually executed the active event, and supplies the recognition result to a system of the active event.

7 Claims, 14 Drawing Sheets

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 255 | 0 | 0 | 0 | 0 | 0 |
| 0 | 0 | 250 | 0 | 0 | 0 | 0 | 0 |
| 0 | 0 | 250 | 0 | 0 | 0 | 0 | 0 |
| 0 | 220 | 250 | 0 | 220 | 0 | 0 | 0 |
| 0 | 220 | 220 | 0 | 220 | 0 | 0 | 0 |
| 0 | 220 | 220 | 200 | 200 | 0 | 0 | 0 |

*FIG. 5*

INFORMATION EXTRACTION APPARATUS AND METHOD

FIELD OF THE INVENTION

The present invention relates to an information extraction apparatus and a method to extract information such as a moving vector or a position of an object from a distance image.

BACKGROUND OF THE INVENTION

As a playing apparatus such as an arcade game machine, games using a human's movement such as boxing games and shooting games have been developed. In the boxing game, the pressure of the user's actual blow to a sandbag is physically measured. In this case, the pressure at the moment when the user's punch hits the sandbag is only measured. Information such as the path and speed of the user's punch is not used. Therefore, this is a monotonous game to pressure strength of a simple punch.

In the shooting game, a light emission source is attached to a head of a toy gun and a position on a screen where the light from the toy gun hits is detected. When the trigger of the gun is pulled, the lighted object is determined to be hit by a shot. Therefore, this is not a game to test the a skill of shooting, but a simple game to compete the user's reflex to quickly find a target and shoot.

On the other hand, by analyzing an image input by a CCD camera, a method to recognize a position or movement of a human's body is used. In this method, the CCD camera inputs an image toward the human's advance direction. In case of extracting the human from the image, for example, the face and hand of the user is skin color. As a pre-processing, useless parts such as background are excluded and the human part is extracted from the image by using the skin color. Then, the shape and movement of the human part are recognized.

First, the pre-processing for a recognition object is explained. In the prior art, in case of extracting the object from the input image, the extraction is executed by using a difference feature between the object and other part. As the difference feature, a change of hue or a difference image is used. In case of using the change of hue, a part whose difference of hue is large is extracted, thinning is executed for the part and an edge part is extracted. When a human is the object, by using the skin color of face and hand of the human, a hue part of the skin color is only extracted. However, the skin color itself changes in proportion to color and angle of illumination. If the hue of the background is similar to the skin color, it is difficult to discriminate the human part from the background in the image. In a condition such as non-illumination, the color of all or part of the input image becomes dark. Therefore, it is also difficult to discriminate the human part in the input image.

In case of extracting information such as the movement or the shape of the target object from the image, a plurality of the target objects are sometimes included in the image. For example, the user works clay, or transforms a virtual photograph by pulling corners of the photograph by both hands. In short, in case of using both hands as the operational motion, each hand (right hand, left hand) must be independently recognized. In this case, an image for the right hand and an image for the left hand are respectively inputted and recognized. In order to recognize both hands independently, two cameras must be used. As a result, the cost of this method is high and the calculation is so heavy.

As another method, a moving object is analyzed by calculating a moving vector (called an optical flow) between frames of a video image. In this method, if many objects are included in the video image, the number of optical flows suddenly increases. Therefore, a calculation load of the optical flows between frames also increases and this calculation processing can not overtake.

Furthermore, in case of extracting movement of human from the image, many useless movements are included in the image. Therefore, it is too difficult to correctly extract the movement of a target. For example, in case of playing a theatrical shooting game by the user's hand instead of a gun, the human's hand is unstable for positioning. Assume that the user shoots at a target using his hand as a gun shape. The user determines the shooting position and direction by a forefinger as a muzzle of the gun, and virtually fires at a moment when the user pulls the thumb as a trigger. In this case, the direction of the forefinger slightly changes between the positioning moment and the firing moment. If the user's shooting skill improves, he can pull the thumb without changing the direction of the forefinger. However, the special skill requirement for all users prevents them to easily enjoy this virtual shooting game.

Furthermore, instead of pulling the thumb after positioning of the forefinger, assume that the user's hand as the gun shape approaches the target in order to virtually pull the trigger and fire. In this case, while approaching the user's hand, the direction and the position of the forefinger change. If the user's hand approaches without moving the forefinger, the user feels an unnatural force in the lower limbs and has a cramp.

The same problem is well known as movement of the hands in taking a picture. In the case of a camera, the object to be photographed stands still. In short, assuming a still picture, a prevention function of the movement of the hands is provided by the camera. However, in case of a jesture using the hands or body, movement of the hands or the body is assumed. Therefore, a method to stabilize the hand's operation such as the prevention function is not adopted.

SUMMARY OF THE INVENTION

It is an object of the present invention to provide an information extraction apparatus and a method to extract the movement and the position of each object from image even if a plurality of objects are included in the distance image.

It is another object of the present invention to provide the information extraction apparatus and a method to correctly extract the movement of objects without useless movement of other parts of the distance image.

According to the present invention, there is provided an information extraction apparatus, comprising: distance image input means for inputting a distance image including a plurality of objects to be respectively recognized; area division means for dividing the distance image into a plurality of areas in correspondence with active event; and image processing means for recognizing the plurality of objects respectively included in the area, and for supplying the recognition result to the active event.

Further in accordance with the present invention, there is also provided an information extraction apparatus, comprising: a distance image input means for inputting a plurality of distance images including an object to be recognized; a basis image extraction means for extracting a basis part of the object for moving from the plurality of distance images as a basis image; and image processing means for calculating a difference image between the basis image and the distance image, and for recognizing the moving of the object in the difference image.

Further in accordance with the present invention, there is also provided an information extraction method, comprising the steps of: inputting a distance image including a plurality of objects to be recognized; dividing the distance image into a plurality of areas in correspondence with active event; recognizing the plurality of objects respectively included in the area; and supplying a recognition result to the active event.

Further in accordance with the present invention, there is also provided an information extraction method, comprising the steps of: inputting a plurality of distance images including an object to be recognized; extracting a basis part of the object for moving from the plurality of distance images as a basis image; calculating a difference image between the basis image and the distance image; and recognizing the movement of the object in the difference image.

Further in accordance with the present invention, there is also provided a computer readable memory containing computer readable instructions, comprising: instruction means for causing a computer to input a distance image including a plurality of objects to be recognized; instruction means for causing a computer to divide the distance image into a plurality of areas in correspondence with active event; instruction means for causing a computer to recognize the plurality of objects respectively included in the area; and instruction means for causing a computer to supply a recognition result to the active event.

Further in accordance with the present invention, there is also provided a computer readable memory containing computer readable instructions, comprising: an instruction means for causing a computer to input a plurality of distance images including an object to be recognized; an instruction means for causing a computer to extract a basis part of the object for moving from the plurality of distance images as a basis image; an instruction means for causing a computer to calculate a difference image between the basis image and the distance image; and an instruction means for causing a computer to recognize the moving of the object in the difference image.

BRIEF DESCRIPTION OF THE DRAWINGS

FIG. 5 is one example of the distance image whose pixel the value is intensity degree of reflected light.

DETAILED DESCRIPTION OF THE PREFERRED EMBODIMENT

To illustrate the present invention, a mole-hitting game will be described. The invention is not, however, limited to that game, but rather may be applied to other games as well as other image recognition applications.

Figure 1:
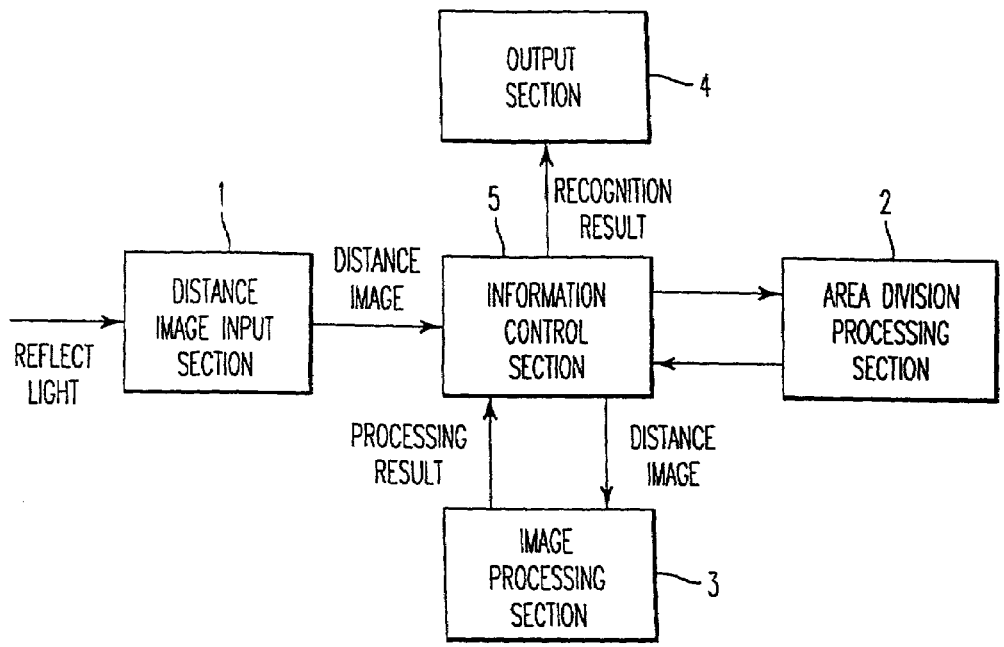
FIG. 1 is a block diagram of the information extraction apparatus according to a first embodiment of the present invention.

FIG. 1 is a block diagram of the information extraction apparatus according to the first embodiment of the present invention. In this case, information such as the shape, movement, and position of objects are extracted (recognized) from a plurality of parts in the image. A "distance" image includes some information on the distance from the image input device to the parts of the image. This extracted information is supplied to other system such as the mole-hitting game.

As shown in FIG. 1, the information extraction apparatus includes a distance image input section 1, an area division processing section 2, an image processing section 3, an output section 4, and an information control section 5. The distance image input section 1 obtains the distance image by receiving light reflected from the object. This technique is disclosed in Japanese Pattent Application PH9-299648. The area division processing section 2 divides the distance image into a plurality of predetermined areas. The image processing section 3 analyzes the distance image divided into areas; calculates the contour of the object, the center of gravity of the object, and the distance to the object; and extracts information such as moving vector or a moving speed of the object. The output section 4 is, for example, a large-sized crystal display or a speaker.

The information control section 5 controls each section 1~4. The information extracted by the image processing section 3 is supplied to another system by the information control section 5.

Figure 2:
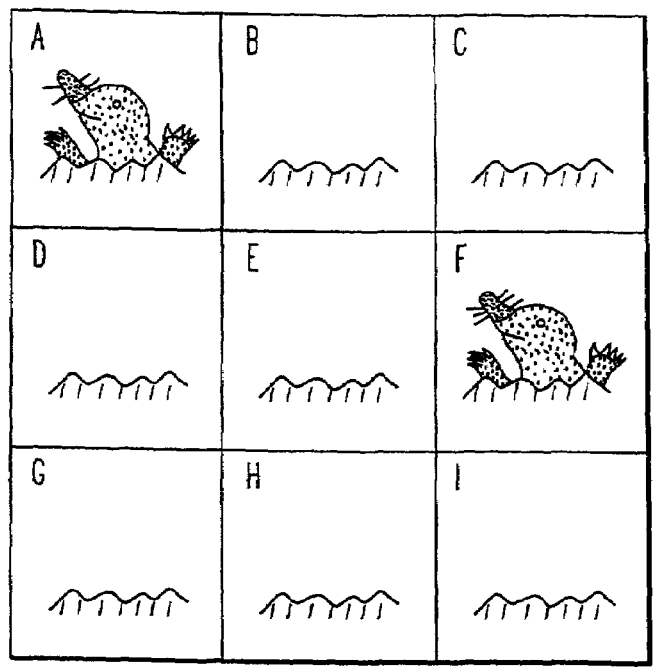
FIG. 2 is a schematic diagram of screen for displaying a mole-hitting game.
Figure 3:
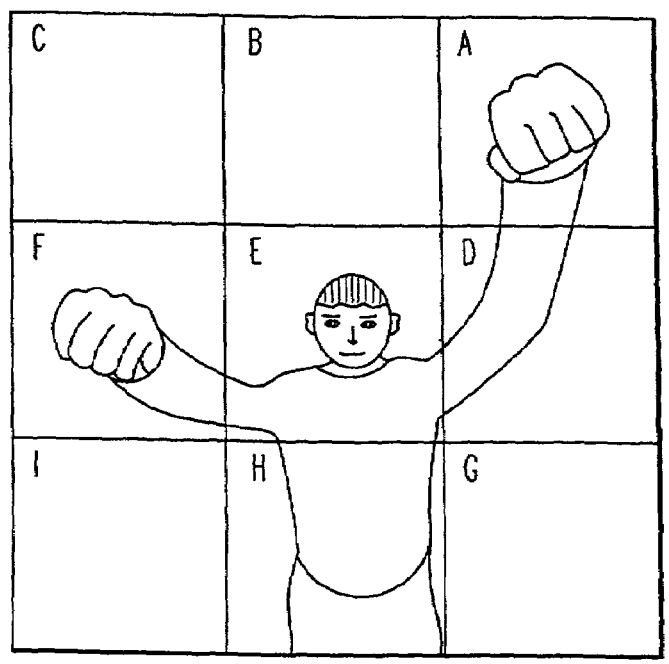
FIG. 3 is a schematic diagram of an image of the user's action for the screen of the mole hitting game in FIG. 2.

For example, as the other system, the mole-hitting game machine is connected by the information control section 5. The other system may be a program executed by the computer. FIG. 2 is one example of the mole hitting game displayed on a screen of the output section 4. FIG. 3 is one example of the distance image including the user's motion when playing the mole-hitting game shown in FIG. 2.

In FIG. 2, the screen of the output section 4 is divided into eight blocks A~I and a virtual mole appears in two blocks A, F. While the user is watching the mole on the screen, the user hits toward the blocks containing the mole on the screen as shown in FIG. 3. In this case, it is not necessary for the user to actually hit the screen. It is sufficient for the user to imitate hitting the blocks containing the moles. In this way, the number of the moles hit by the user is counted for each user.

The distance image input section 1 is previously set on the screen in order to recognize which block (mole) the user hits (respectively recognizing the right hand and left hand of the user on the screen). The area division processing section 2 divides the distance image including the user's motion in correspondence with each block on the screen. Each area A~H on the distance image in FIG. 3 corresponds to each block A~H on the screen in FIG. 2. The image processing section 3 analyzes only the area corresponding to the blocks including the mole. In FIG. 3, only two areas A, F are analyzed because they correspond to active blocks A, F (mole block) in FIG. 2.

Figure 4:
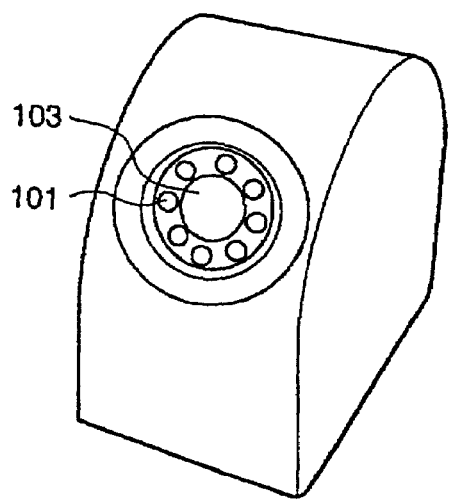
FIG. 4 is one example of the appearance of the distance image input section in FIG. 1.

Next, the distance image input section 1 and the distance image are explained. FIG. 4 shows the appearance of the distance image input section 1. At the center part, a light-intercepting section 103 is located, which consists of a circular lens and an area sensor behind the circular lens (not shown). Surrounding the light-intercepting section 103, a plurality (eight) of emission sections 101 are located at predetermined intervals, which consist of LEDs to radiate infrared rays. The light radiated from the emission section 101 is reflected by the object, collected by the lens of the light-intercepting section 103, and intercepted by the area sensor behind the lens. In the area sensor, for example, "256×256" sensors are arranged in a matrix condition, and the intensity degree of the reflect light intercepted by each sensor is regarded as pixel value. In this way, as shown in FIG. 5, the distance image as a distribution of the intensity degree of the reflect light is obtained.

Figure 6:
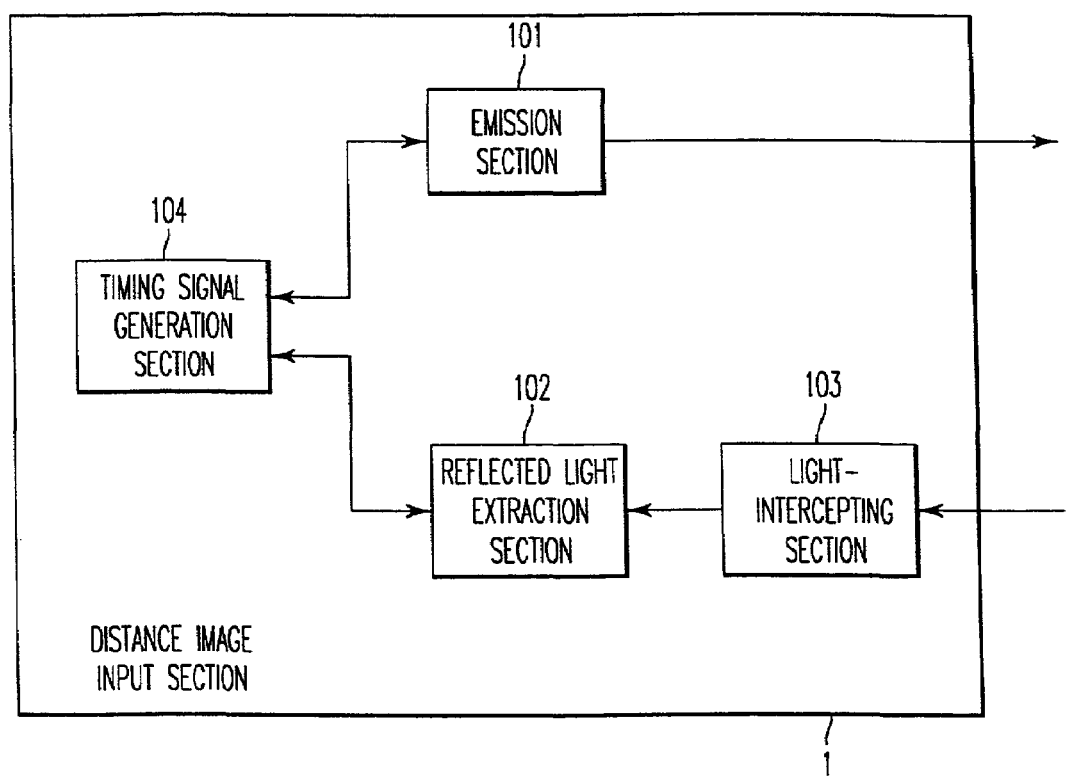
FIG. 6 is a block diagram of the distance image input section in FIG. 4.

FIG. 6 is a block diagram of the distance image input section 1, which mainly includes the emission section 101, a reflected light extraction section 102, the light-intercepting section 103, and a timing signal generation section 104. The emission section 101 radiates a light whose intensity degree periodically changes in response to a timing signal generated by the timing signal generation section 104. This light irradiates the object (human) in front of the emission section 101. The light-intercepting section 103 detects a quantity of the reflected light from the object. The reflect light extraction section 102 extracts a distribution of the intensity degree of the reflected light. This special distribution of the intensity degree of the reflected light is called, in this example, the distance image.

In general, the light-intercepting section 103 intercepts outdoor light such as illumination and sunshine in addition to the reflect light. Therefore, the reflect light extraction section 102 calculates the difference between a quantity of intercepted light in case of emitting of the emission section 101 and a quantity of intercepted light in case of non-emitting of the emission section 101 in order to extract only the reflected light from the object. In this way, the reflect light extraction section 102 extracts the distribution of the intensity degree as the distance image shown in FIG. 5. FIG. 5 shows 8×8 pixels as a part of 256×256 pixels of the distance image.

The quantity of the reflected light from the object greatly reduces in proportion to a distance between the object and the distance image input section 1. In case the surface of the object uniformly scatters the light, a quantity of intercepted light per one pixel decreases in inverse proportion to a square of the distance to the object.

In FIG. 5, the pixel value of each cell in the matrix represents the intensity degree of the reflect light as 256 levels (8 bits). For example, the pixel value "255" represents that corresponding part of the object closest to the distance image input section 1. The pixel value "0" represents that the corresponding part (or background) is far from the distance image input section 1 and the reflected light does not reach the distance image input section 1.

Figure 7:
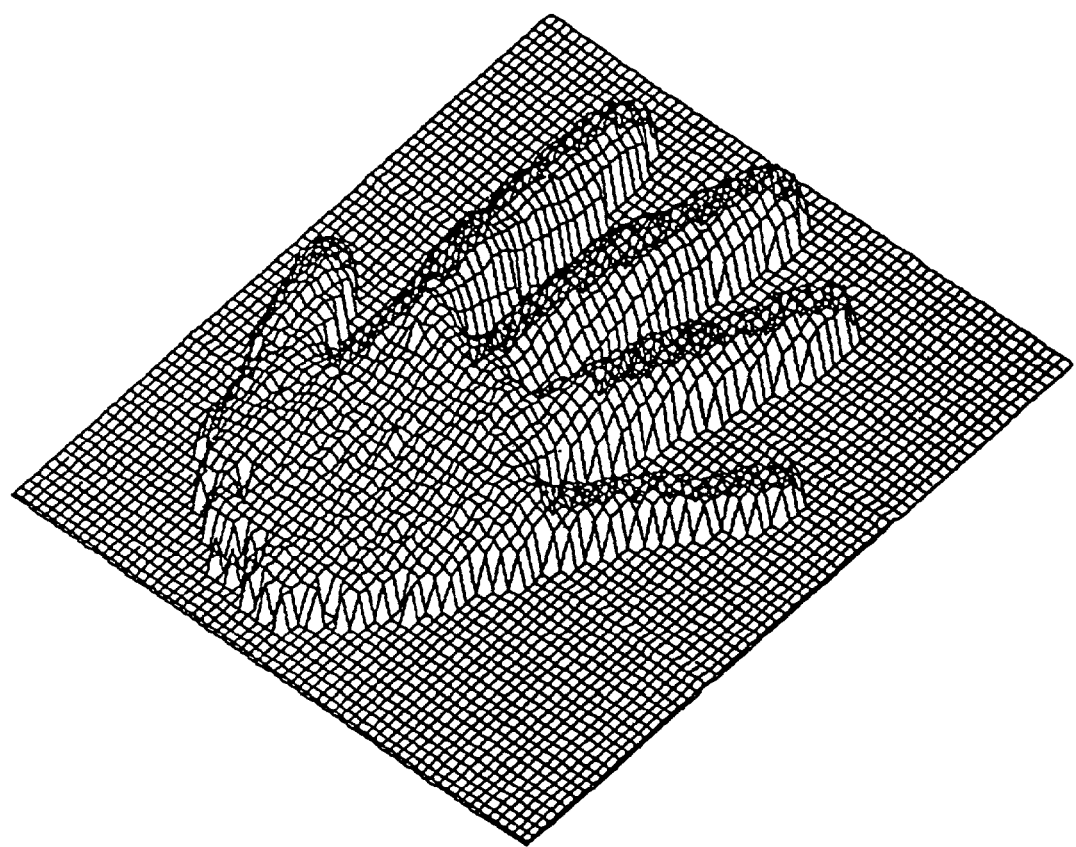
FIG. 7 is one example of a three-dimensional image for the distance image in FIG. 6.

In short, each pixel value in the distance image represents a quantity of the reflected light intercepted by the light-intercepting unit corresponding to each pixel. The reflected light is affected by characteristics (scattering, absorption, etc), and the direction and distance of the object. In case all parts of the object uniformly scatter the light, the quantity of the reflected light is related to the distance to the object. A human's hand includes such characteristics. As the distance image for the hand extending in front of the distance image input section 1, a three-dimensional image reflected by the distance and a slope of the hand is obtained as shown in FIG. 7.

Figure 8:
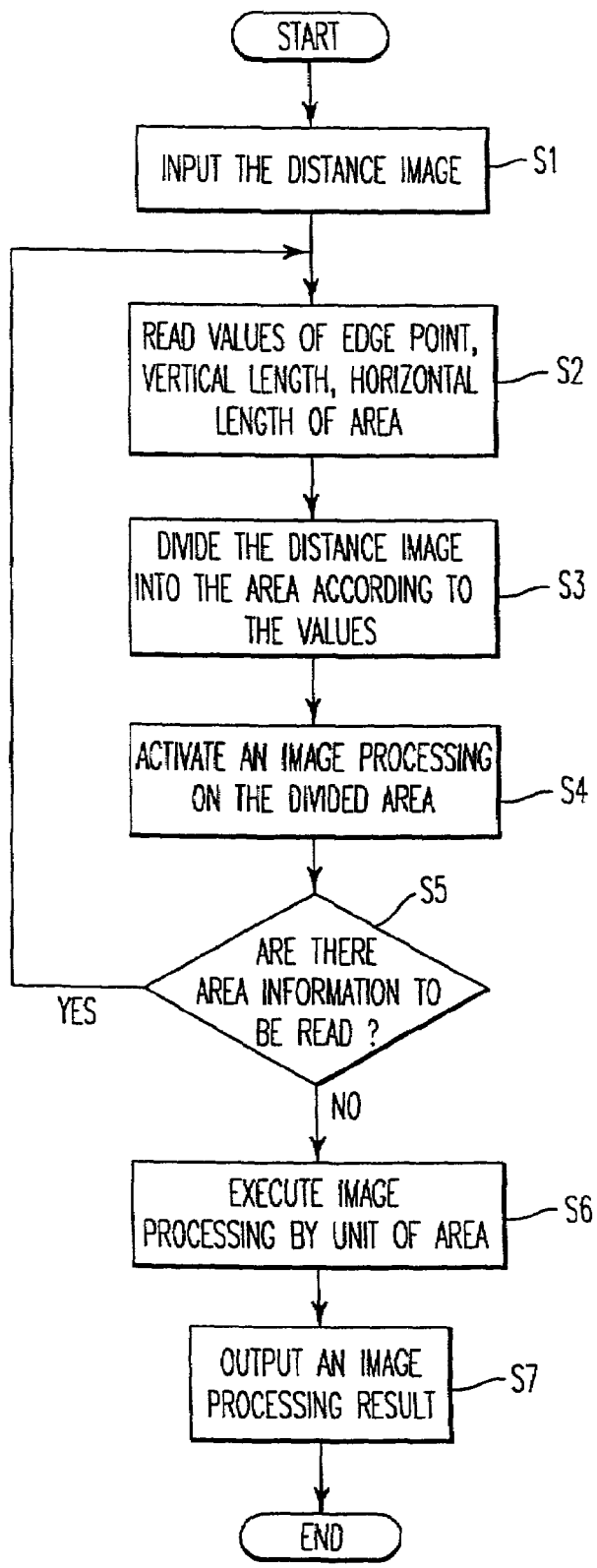
FIG. 8 is a flow chart of the processing of the information extraction method according to the first embodiment of the present invention.

Next, by referring to a flow chart in FIG. 8, processing of the information extraction apparatus in FIG. 1 is explained. First, in response to turning on a power supply or a start indication, an initialization processing is executed. Then, the distance image input section 1 inputs the distance image by using the emission section 101 and the light-intercepting section 103 in FIG. 6 (step S1).

Figure 9A:
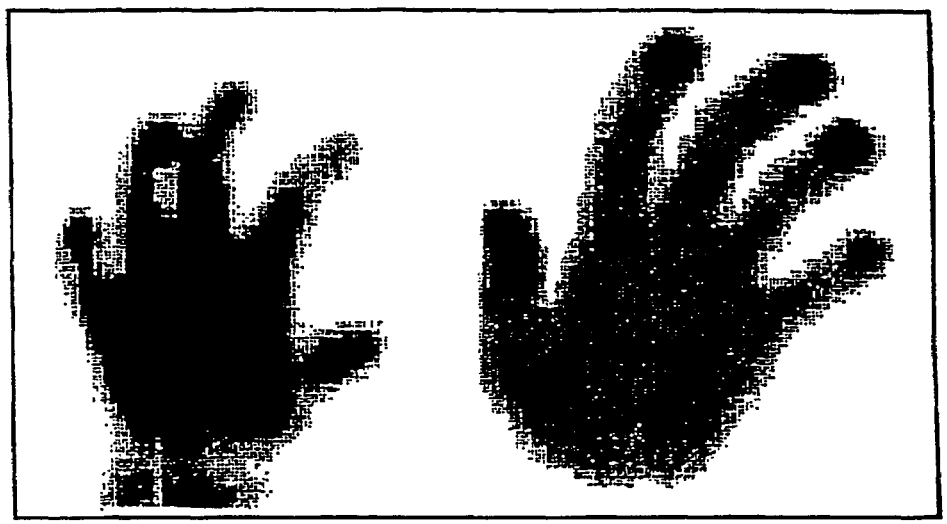
FIGS. 9A and 9B are schematic diagrams of the distance image including both hands and two divided distance images respectively including one hand.

For example, this input is executed at a speed of one or two images per second. One example of input distance image is shown in FIG. 9A. This distance image in FIG. 9A includes a right hand and a left hand as the object. Therefore, it is necessary to recognize the movement, the shape, and the position of each hand.

Next, the area division processing section 2 receives the area information from the information control section 5. For example, in case of the mole-hitting game, as the area information corresponding to the block in which the mole appeared at predetermined intervals (distance image input interval, for example, 1 second), a coordinate value of edge point, a vertical length, and a horizontal length of the area are read from the information control section 5 (step S2). Based on the area information, for example, the distance image in FIG. 9A is divided into two areas in FIG. 9B.

Figure 9B:
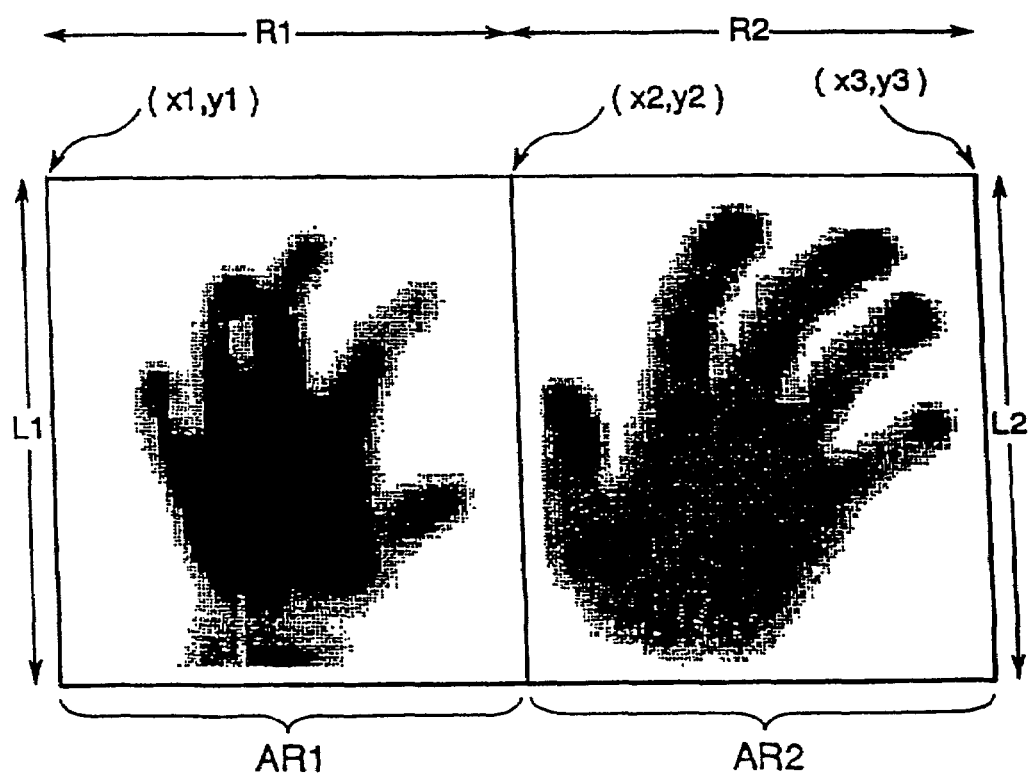

Assume that two moles are momentarily displayed on the screen of the output section 4. The information control section 5 supplies a first area information corresponding to the block of the first mole (a left upper edge point T1 (x1, y1), a right upper edge point T2 (x2, y2), a vertical length L1, and a horizontal length R1). The divided area AR1 in FIG. 9B is obtained by using the first area information. Furthermore, a second area information corresponding to the block of a second mole (a left upper edge point T2 (x2, y2), a right upper edge point T3 (x3, y3), a vertical length L2, and a horizontal lenght R2) is supplied. The divided area AR2 in FIG. 9B is obtained by using the second area information. In FIG. 9B, two divided areas AR1 and AR2 do not overlap each other, but may overlap. The number of divided areas in FIG. 9B is two, but a larger number of the divided areas may be adopted. Furthermore, it is not necessary that each divided area is the same or that the shape of each divided area is a rectangle. The shape of each divided area may be a triangle, a polygon, or a circle.

After dividing, the area division processing section 2 assigns the image processing-process to each divided area (step S4). The image processing-process may be the same for each divided area, or may be different according to circumstances. Anyway, the image processing section 3 must prepare a plurality of the image processing-process corresponding to the maximum number of divided areas. The area division processing section 2 repeats the above processing of steps S2~S4 untill no area information remains to be read in the information control section 5 (step S5).

As for the distance image shown in FIG. 5, the image processing section 3 executes image processing by unit of the area divided by the area division processing section 2 (step S6). This image processing is, for example, extraction of the edge (extraction of the boundary of the object), extraction of the center of gravity, calculation of the distance to the object, calculation of the moving vector in order to extract information such as shape, movement, and position of the object.

Figure 10:
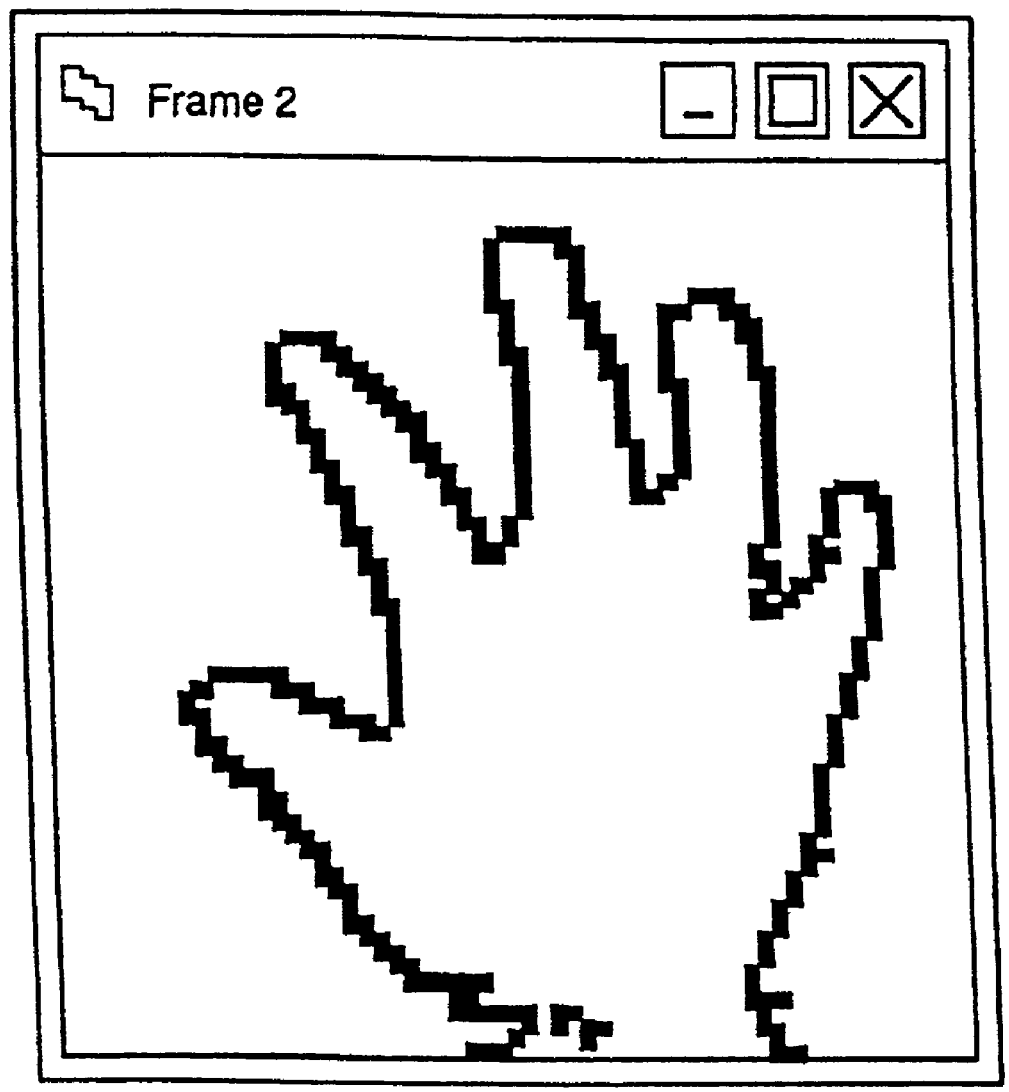
FIG. 10 is one example of contour image of the object extracted from the distance image.

In FIG. 9B, two same image processing-processes are respectively executed for cells after the cell whose pixel value is below a threshold is excluded from two divided areas AR1, AR2. In this image processing-process, the divided area and a contour line of the object in the divided area is extracted as shown in FIG. 10. In order to extract the boundary line, neighboring pixel values are compared, a constant value is assigned to the cell whose difference value is above a threshold α and continuous pixels to which the constant value is assigned are extracted as the contour line.

In this case, assume that the pixel value of coordinate position (i, j) on the matrix is P(i, j) and pixel value of the contour line is R(i, j). By using following condition, the contour line shown in FIG. 10 is obtained.

(1) If $\{P(i, j)-P(i-1, J)\}>\alpha$,
$\{P(i, j)-P(i, j-1)\}>\alpha$, ... R(i, j)=255
$\{P(i, j)-P(i+1, j)\}>\alpha$,
$\{P(i, j)-P(i, j+1)\}>\alpha$ (2) Otherwise ... R(i, j)=0

In each image processing-process, the center of gravity of the object is calculated based on the contour information shown in FIG. 10. By comparing a position of the center of gravity with a position of the center of gravity extracted from the previous frame, it is decided whether the object in the divided area is moving. In case it is moving, the moving vector representing the change quantity and change direction of the center of gravity is calculated. Furthermore, by comparing the contours extracted from the distance images inputted successively, the moving vector of an arbitrary point on the contour may be calculated.

In order to calculate the distance "d" to the object whose contour is extracted, a representative pixel value neighboring the center of gravity of the object is calculated. As the representative pixel value, an average value or a closest neighboring value is adopted. In this case, assume that the closest neighboring value is used. The intensity of the reflected light from the object increases in inverse proportion to the square of the distance to the object as following equation.

$$Q(i, j)=K/d^2 \quad (1)$$

Q(i, j): representative the pixel value of the object
K: coefficient

In the above equation (1), for example, "K" is previously determined to be "pixel value R(i, j)=255 in case of "d"=0.5 m". By using the equation (1), the distance value "d" is calculated.

In this way, the shape, the movement, and the position of the object are extracted from each divided area. For example, in case of the mole hitting game, assume that two moles appear on each block of the screen within a predetermined interval (for example, 1 second). The image processing section 3 executes the above-mentioned processing for each divided area corresponding to two mole blocks. In this case, as shown in FIG. 9B, the center of gravity (three-dimensional coordinate including the distance value) of the contour line (user's right hand and left hand) is extracted from each divided area AR1, AR2. The center of gravity information is supplied to the information control section 5. The information control section decides that the mole is hit by the user if the center of gravity of the hand is located within a predetermined limit from the mole block. In this case, for example, the hit mole on the block screams, or points corresponding to the hit mole are counted (step S7).

As mentioned-above, in the present invention, the area division processing section 2 divides the distance image into a plurality of areas. In each area corresponding to an active event (mole block), the image processing is respectively executed. Even if a number of areas to be processed increases in proportion to a number of active blocks, in case the number of areas is not above a number of image processing-processes prepared, new divided areas are coped by assigning the image processing-process. In short, if the number of areas to be recognized increases, the information control section 5 stores the area information of increased area.

Alternatively, while the output section 4 displays the distance image, a user interface for the user to indicate his desired area may be used. In this case, the user inputs the position of the area to be recognized on the distance image by using a pointing device such as a pen or a mouse. This input area information is stored in the information control section 5. The area division processing section 2 divides the distance image by reading the area information from the information control section 5.

For example, if the information extraction apparatus in FIG. 1 is connected to the mole-hitting game, the distance image is divided into a plurality of areas corresponding to blocks to respectively display the mole on the screen. As shown in FIG. 2, assume that the screen consists of twelve blocks to respectively display the mole and the mole is displayed in two blocks A, F at one moment. In this case, as shown in FIG. 3, two divided areas A, F in the distance image correspond to the mole blocks A, F. Therefore, as for the two areas A, F, the center of gravity of the hand (object) is recognized and it is decided whether the mole is hit according to the position of the center of gravity of the hand. In short, the image processing is quickly executed because other areas B, C, D, E, G, H, I corresponding to non-mole blocks are not recognized.

The information extraction apparatus of the present invention is applied for various kinds of system. For example, in case of a system to play musical instruments using both hands, the user can play a plurality of musical instruments by using a right hand for cymbals and a left hand for a timpani. In this case, the center of gravity of both hand in two divided areas is extracted, a first speed of movement along a depth direction (Z axis) and a second speed of movement along the right and left directions (X axis) are calculated. Based on the calculation result, the system assignes the first speed to volume of playing sound and the second speed to frequency of the playing sound. In this way, the user can easily and intuitively play the musical instruments.

When the distance image is divided, if a size of the divided area is too small, a subtle motion irrelevant to the object's movement to be recognized is undesirably recognized. For example, in case the information extraction apparatus in FIG. 1 is applied for a portable system, a human's hand is unconsciously and slightly moving (for example, movement of the hands). If the size of each divided area is too small, the movement of the object in the divided area is not correctly recognized. Therefore, the size of the divided area is desirably not too small by setting a lower limit in order not to affect the movement of the hands to recognition of the object.

Figure 11:
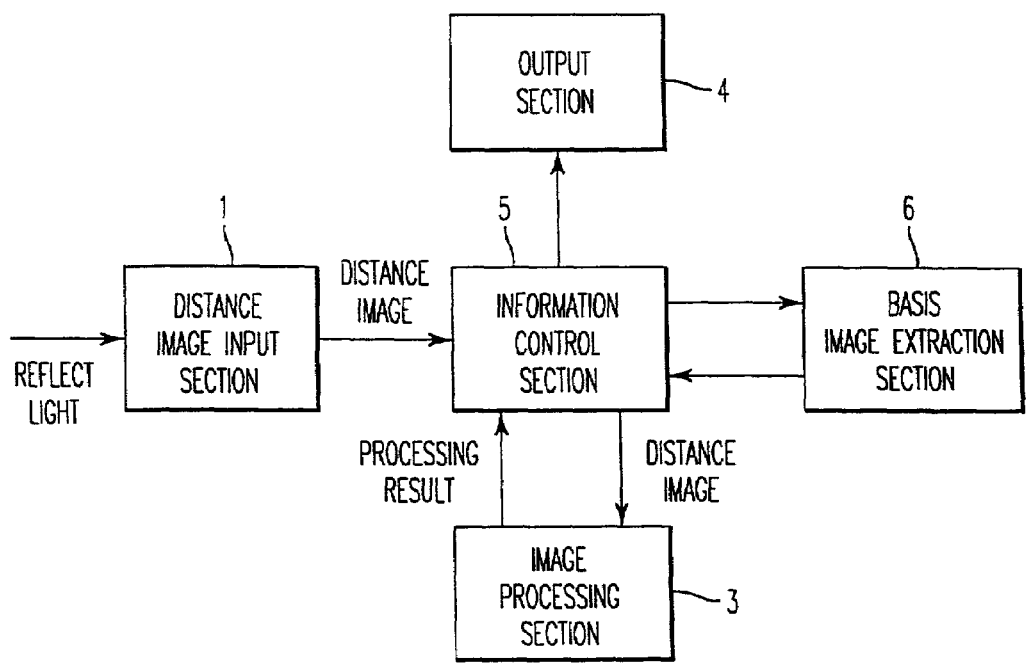
FIG. 11 is a block diagram of the information extraction apparatus according to a second embodiment of the present invention.

FIG. 11 is a block diagram of the information extraction apparatus according to a second embodiment of the present invention. In FIG. 11, the area division processing section 2 in FIG. 1 is replaced by a basis image extraction section 6. The basis image extraction section 6 extracts a basis part (for example, a body) for a relative movement from the distance image if the relative movement of an arm to the body of the user is extracted. Assume that a human is playing a sport or a game by using instruments. In this case, the whole body of the human is moving. However, in a motion for hitting a ball with a racket and striking the ball, if it is decided whether the racket hits the ball or in which direction the ball is hit by the racket, it is sufficient to analyze the motion of an arm holding the racket of the human. It is not necessary to analyze how to move the whole body of the human. Therefore, in the second embodiment, the movement of the part to be recognized (for example, the arm) is recognized as a relative movement based on a movement of the basis part (for example, the body). Concretely speaking, after the basis part as a non-recognition object is excluded from the distance object, a part as recognition object is recognized by the image processing.

Figure 12:
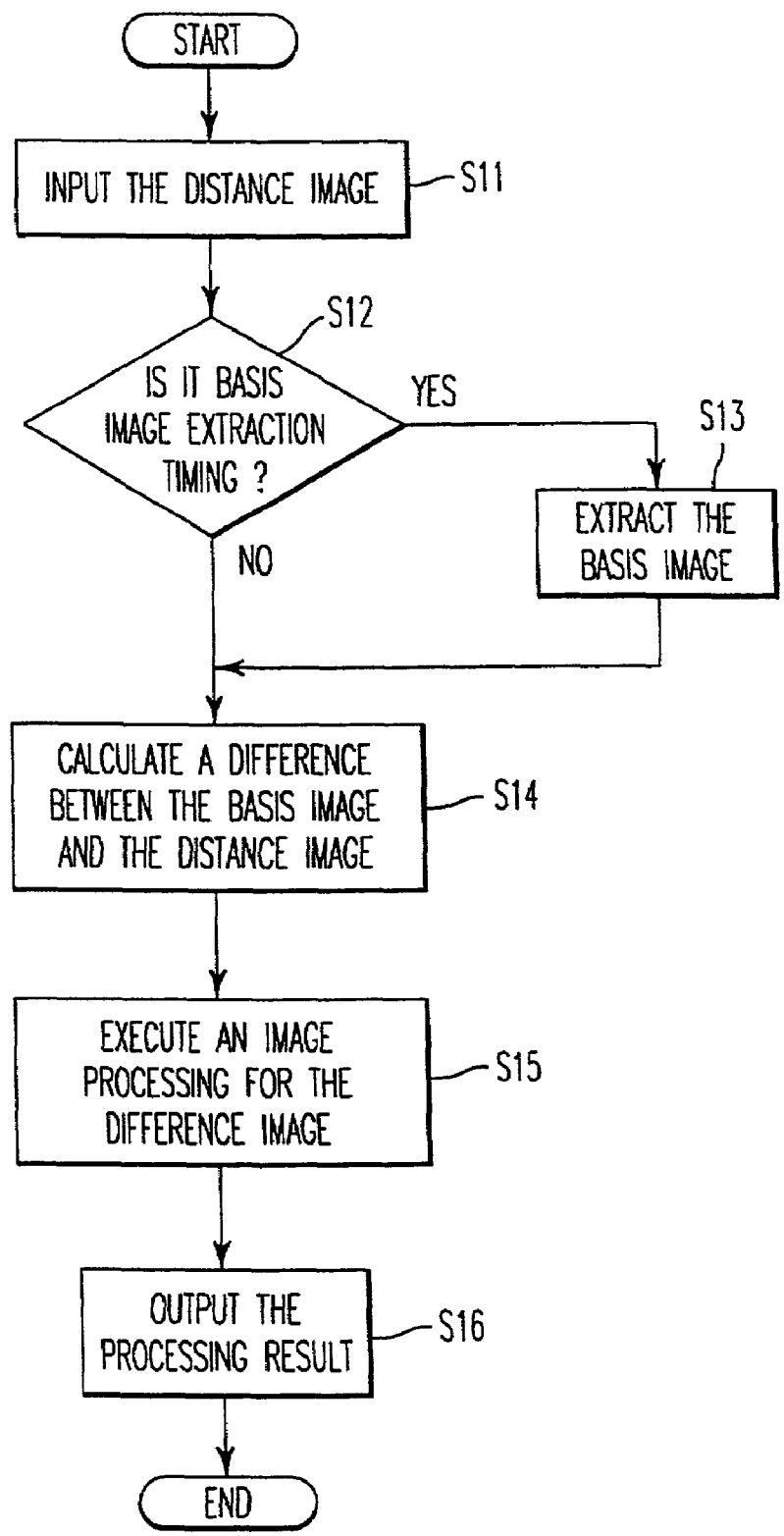
FIG. 12 is a flow chart of the processing of the information extraction method according to the second embodiment of the present invention.

Next, by referring to the flow chart shown in FIG. 12, processing of the image extraction apparatus in FIG. 11 is explained. First, in response to turning on a power supply or a start indication signal, an initialization processing is executed. Then, the distance image input section 1 inputs the distance image through the emission section 101 and the light-intercepting section 103 (step S11). For example, the input speed is one hundred images per second. The basis image extraction section 6 obtains one or two images from the one hundred images per second at predetermined interval (basis image extraction timing) (step S12). Assume that the basis image extraction section 6 obtains the distance image shown in FIG. 13 at one basis image extraction timing. The basis image extraction section 6 extracts a part whose distance value is larger than a threshold (far from the input section 1) as the basis image from the distance image. Alternatively, a part whose distance value is smaller than a threshold or a part which is not moving is extracted as the basis image (step S13).

Figure 13:
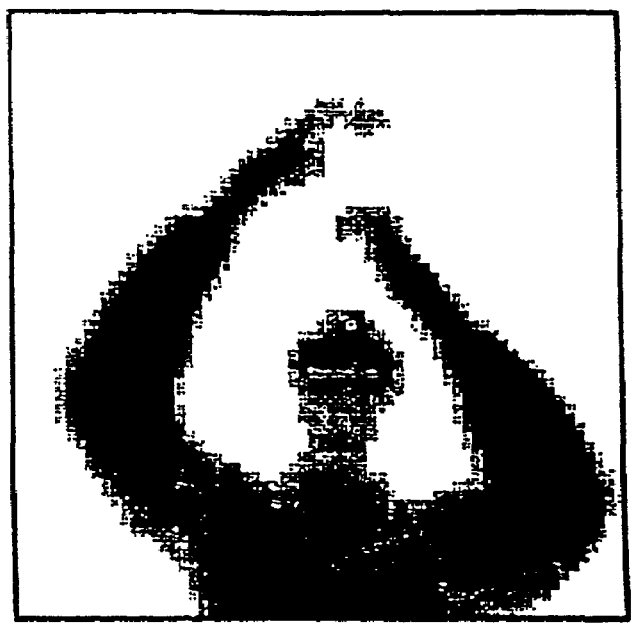
FIG. 13 is first example of the distance image obtained by the distance image input section.

A method for extracting the basis image by the distance value is explained. Actually, the distance image shown in FIG. 13 is the distribution of intensity degree of the reflected light shown in FIG. 5. Each pixel value as the intensity degree represents the distance value from the distance image input section 1 to the object. The smaller the pixel value is, the larger the distance from the camera to the object is. The larger the pixel value is, the smaller the distance from the camera to the object is. Accordingly, if the camera (distance image input section 1) is located in a fixed position, a relationship between the pixel value and the distance value is previously calculated by the equation (1) and the pixel value of the distance image. The basis image extraction section 6 desirably prepares a table for storing the relationship. In this case, the distance value as a standard is determined according to the characteristic of the basis image (or characteristic of the object to be recognized). By referring to the table, a basis part consisting of pixel values corresponding to the distance value larger than the standard is extracted as the basis image. Alternatively, a basis part consisting of pixel values corresponding to distance value smaller than the standard may be extracted.

A method for extracting the basis image by the movement is explained. As for the distance image obtained at the basis image extraction timing, the basis image extraction section 6 extracts a contour of each object and calculates the center of gravity of the contour. For example, in case of the human included in the distance image, the center of gravity of a body, a right arm, and a left arm is respectively calculated. By comparing the center of gravity of the same parts in the distance images obtained successively, a part whose change quantity of the center of gravity is below a threshold is extracted as the basis part from the distance image.

Figure 14:
FIG. 14 is second example of the distance image obtained by the distance image input section.
Figure 15:
FIG. 15 is third example of the distance image obtained by the distance image input section.
Figure 16:
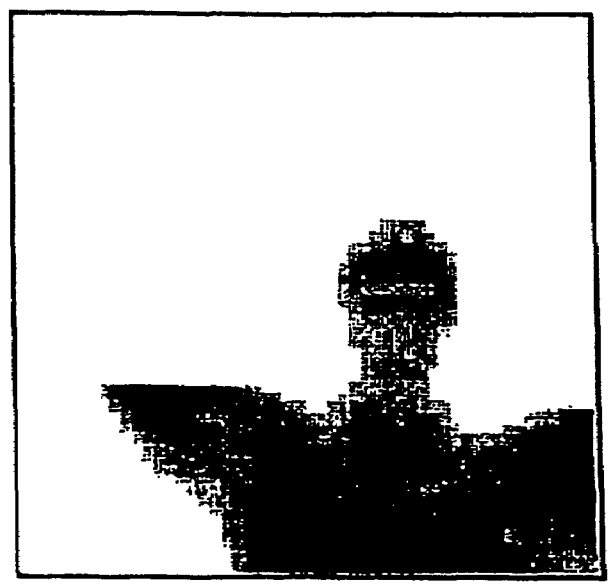
FIG. 16 is a basis image extracted from the distance image in FIG. 13.
Figure 17:
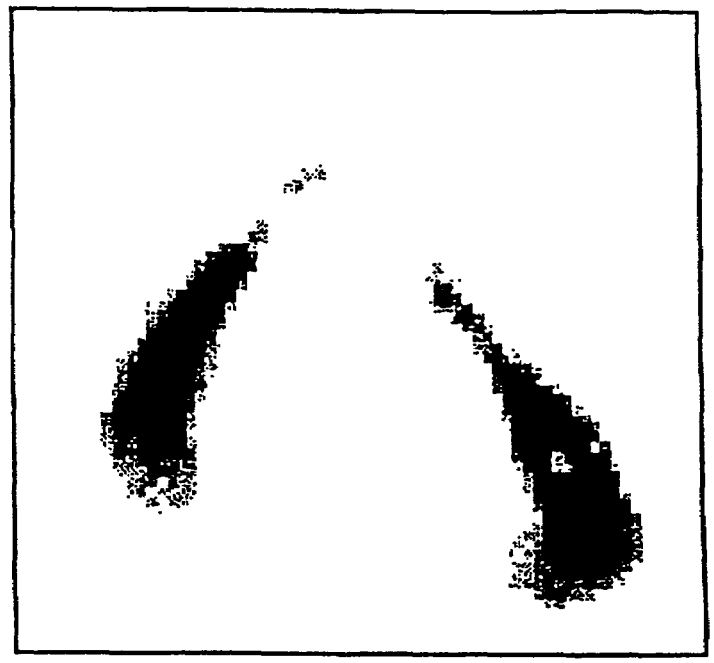
FIG. 17 is a difference image between the basis image in FIG. 16 and the distance image in FIG. 13.
Figure 18:
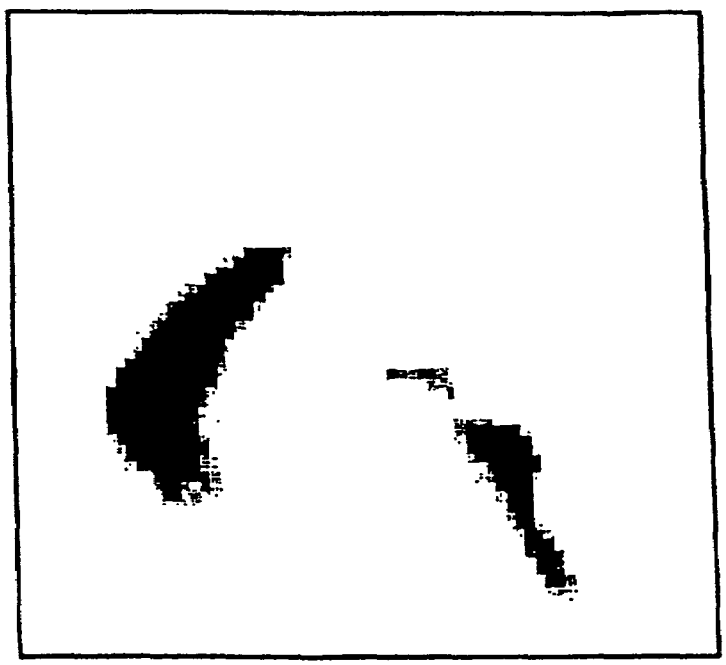
FIG. 18 is a difference image between the basis image in FIG. 16 and the distance image in FIG. 14.

FIG. 16 shows the basis part (human's body) extracted from the distance image in FIG. 13. After the basis part is extracted from the distance image at the basis image extraction timing, the basis image extraction section 6 calculates the difference between the basis image and the distance image (step S14). For example, assume that a body part of the human is extracted as the basis image shown in FIG. 16, and three distance images shown in FIGS. 13, 14, 15 are inputted in order by the distance image input section 1. As a difference between the basis image in FIG. 16 and the distance image in FIG. 13, the difference image including both arm parts of the human is obtained as shown in FIG. 17. In the same way, FIG. 18 shows the difference image between the basis image in FIG. 16 and the distance image in FIG. 14.

Figure 19:
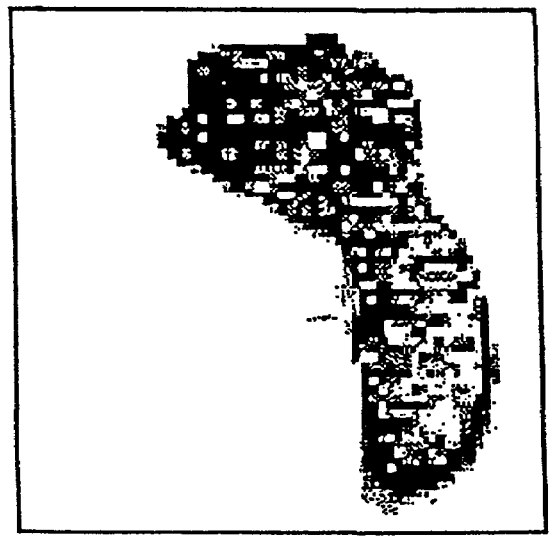
FIG. 19 is a difference image between the basis image in FIG. 16 and the distance image in FIG. 15.

FIG. 19 shows the difference image between the basis image in FIG. 16 and the distance image in FIG. 15. The image processing section 3 executes the image processing-process for the difference image in order to extract the shape, the movement, and the position of the remaining part (step S15). This image processing-process is, for example, extraction of the edge (extraction of contour of the remaining part), extraction of the center of gravity, and calculation of the area, distance and moving vector. In case of the mole-hitting game, the contour and the center of gravity (three-dimensional coordinate) of each arm are extracted from the difference images in FIGS. 17, 18, 19. In the same way as in the first embodiment, the center of gravity information is supplied to the information control section 5. The information control section decides that the mole is hit by the user if the center of gravity is located within the predetermined limit from the mole block on the screen. In this case, for example, the hit mole on the block screams or points corresponding to the hit mole are counted (step S16).

The information extraction apparatus of the second embodiment may be applied for an arcade version of the mole hitting game. In this case, the user naturally gesticulates hitting for the mole on the screen by using his elbow as a fulcrum. In this way, the operation of hitting the mole is easily realized.

As mentioned-above, in the second embodiment, for example, a relative motion of the arm based on the body of the user is extracted from the distance image. Therefore, the motion of the moving part (arm) is correctly recognized without effect of useless motion of other part (body).

Figure 20:
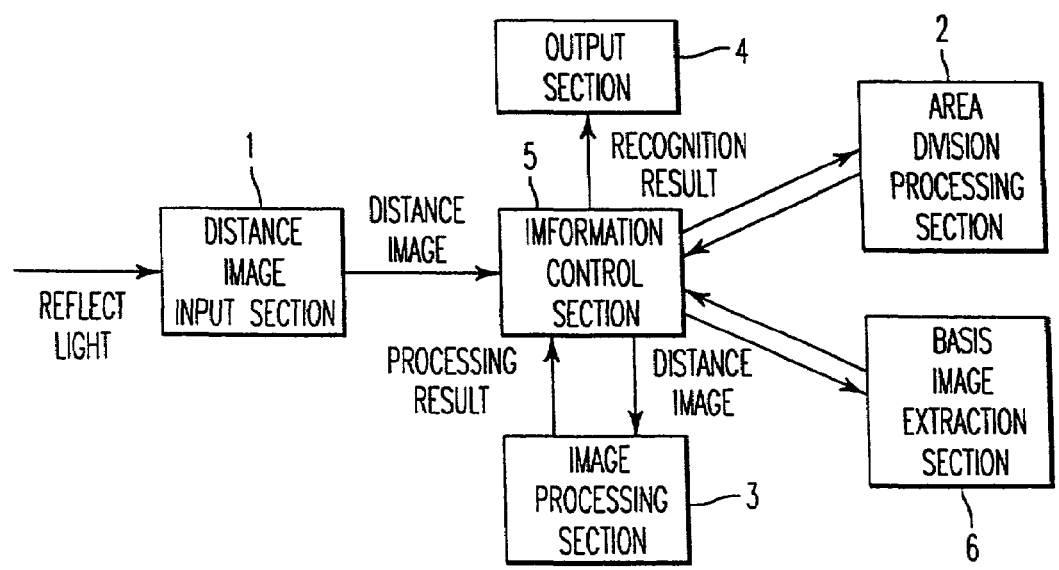
FIG. 20 is a block diagram of the information extraction apparatus according to a third embodiment of the present invention.

FIG. 20 is a block diagram of the information extraction apparatus according to a third embodiment of the present invention. In FIG. 20, both the area division processing section 2 and the basis image extraction section 6 are present. Processing of the image extraction apparatus in FIG. 20 is explained. In the same way of processing as shown in FIG. 9, the distance image input section 1 inputs the distance image at predetermined intervals (for example, two images per second). The area division section 2 divides the distance image into a plurality of areas according to the area information supplied by the information processing section 5. The basis image extraction section 6 extracts the basis image from each divided area at predetermined intervals (for example, one basis image per second), and calculates a difference image between each divided area and corresponding basis image. The image processing section 3 executes image processing-process for each difference image in order to extract the shape, the movement, and the position of the remaining part in the difference image. In same way as the first and second embodiments, the image processing-process is, for example, an extraction of the edge (extraction of contour of the remaining part), extraction of the center of gravity, or calculation of the area, distance and moving vector.

A memory can be used to store instructions for performing the process described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A computer readable memory including computer readable instruction, comprising:

instruction means for causing a computer to control an input device to acquire a distance image by (a) periodically changing the intensity of a light source which irradiates a plurality of objects to be respectively recognized and (b) determining a distribution of intensity of the reflected light from the plurality of objects;

instruction means for causing a computer to divide the distance image into a plurality of areas according to position information of a plurality of blocks, and to identify blocks containing an active event;

instruction means for causing a computer to recognize the plurality of objects in the areas corresponding to the blocks containing the active event, and to supply the recognition result to a system of the active event; and instruction means for causing a computer to control a display means including the plurality of blocks, wherein at least two blocks contain an active event, wherein the plurality of objects are body parts of a user which are respectively moving toward the active block on said display means, and the body parts are a right arm and a left arm of the user and the active block on said display means momentarily includes a target character.

2. A computer-implemented method, comprising the steps of:

instructing an input device to acquire a distance image by (a) periodically changing the intensity of a light source which irradiates a plurality of objects to be respectively recognized and (b) determining a distribution of intensity of the reflected light from the plurality of objects;

dividing the distance image into a plurality of areas according to position information of a plurality of blocks, and identifying blocks containing an active event;

recognizing the plurality of objects in the areas corresponding to the blocks containing the active event, and supplying the recognition result to a system of the active event; and controlling a display means including the plurality of blocks, wherein at least two blocks contain an active event, wherein the plurality of objects are body parts of a user which are respectively moving toward the active block on said display means, and the body parts are a right arm and a left arm of the user and the active block on said display means momentarily includes a target character.

3. A computer readable memory including computer readable instruction, comprising:

instruction means for causing a computer to control an input device to acquire a plurality of distance images by (a) periodically changing the intensity of a light source which irradiates an object to be recognized and (b) repeatedly determining a distribution of intensity of the reflected light from the object;

instruction means for causing a computer to extract a basis part of the object that does not move between at least two of the plurality of distance images as a basis image, wherein the basis image is extracted; and instruction means for causing a computer to calculate a difference image between the basis image and each of the plurality of distance images, and to recognize the movement of the object in the difference image, wherein said instruction means for causing a computer to extract a basis image causes the computer to extracts the basis image at predetermined intervals in synchronization with the input timing of the distance image.

4. A computer-implemented method, comprising the steps of:

instructing an input device to acquire a plurality of distance images by (a) periodically changing the intensity of a light source which irradiates an object to be recognized and (b) repeatedly determining a distribution of intensity of the reflected light from the object;

extracting a basis part of the object that does not move between at least two of the plurality of distance images as a basis image, wherein the basis image is extracted; and calculating a difference image between the basis image and each of the plurality of distance images, and recognizing the movement of the object in the difference image, wherein said extracting step includes extracting the basis image at predetermined intervals in synchronization with the input timing of the distance image.

5. A computer readable memory including computer readable instruction, comprising:

instruction means for causing a computer to control an input device to acquire a plurality of distance images by (a) periodically changing the intensity of a light source which irradiates an object to be recognized and (b) repeatedly determining a distribution of intensity of the reflected light from the object;

instruction means for causing a computer to extract a basis part of the object that does not move between at least two of the plurality of distance images as a basis image; and instruction means for causing a computer to calculate a difference image between the basis image and each of the plurality of distance images, and to recognize the movement of the object in the difference image, wherein the basis part of the object is a body of a user, and said instruction means for causing a computer to recognize the movements of the object causes the computer to recognizes the movement of arms of the user in the difference image.

6. The computer readable memory according to claim 5, further comprising:

instruction means for causing a computer to control a display means for displaying a target character, wherein said instruction means for causing a computer to recognize the movements of the object causes the computer to supply a hit signal to said display means if a position of the moving arms moves to within a predetermined space from the target character.

7. A computer-implemented method, comprising the steps of:

instructing an input device to acquire a plurality of distance images by (a) periodically changing the intensity of a light source which irradiates an object to be recognized and (b) repeatedly determining a distribution of intensity of the reflected light from the object;

extracting a basis part of the object that does not move between at least two of the plurality of distance images as a basis image; and calculating a difference image between the basis image and each of the plurality of distance images, and recognizing the movement of the object in the difference image, wherein the basis part of the object is a body of a user, and said recognizing step includes recognizing the movement of arms of the user in the difference image.

* * * * *